Feb. 28, 1950     E. K. MORGAN     2,499,152
CONTROL MECHANISM FOR MACHINE TOOLS
Original Filed Jan. 30, 1943     2 Sheets-Sheet 1
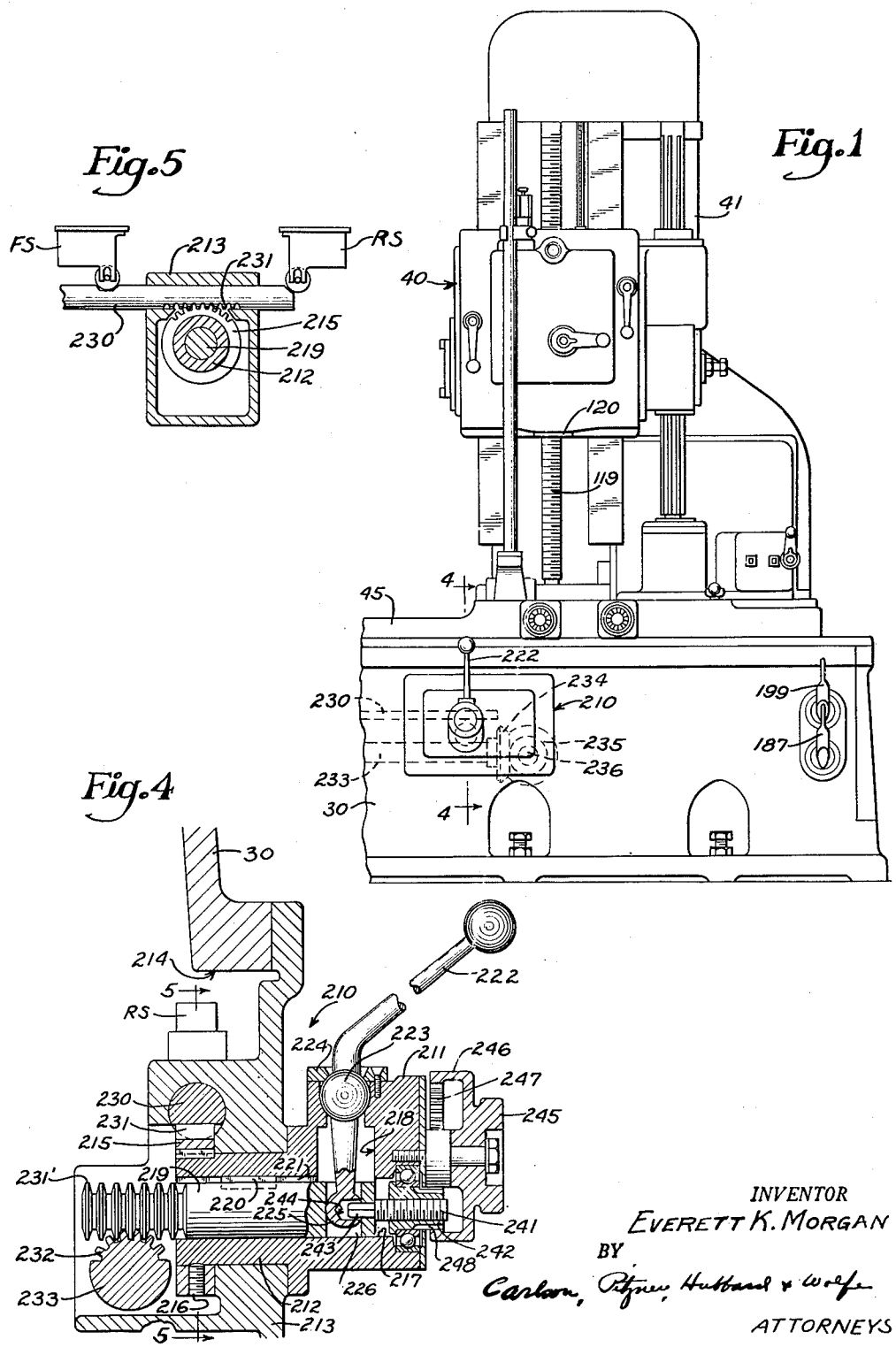
INVENTOR
EVERETT K. MORGAN
BY
Carlson, Pitney, Hubbard & Wolfe
ATTORNEYS Feb. 28, 1950 E. K. MORGAN 2,499,152
CONTROL MECHANISM FOR MACHINE TOOLS
Original Filed Jan. 30, 1943 2 Sheets-Sheet 2
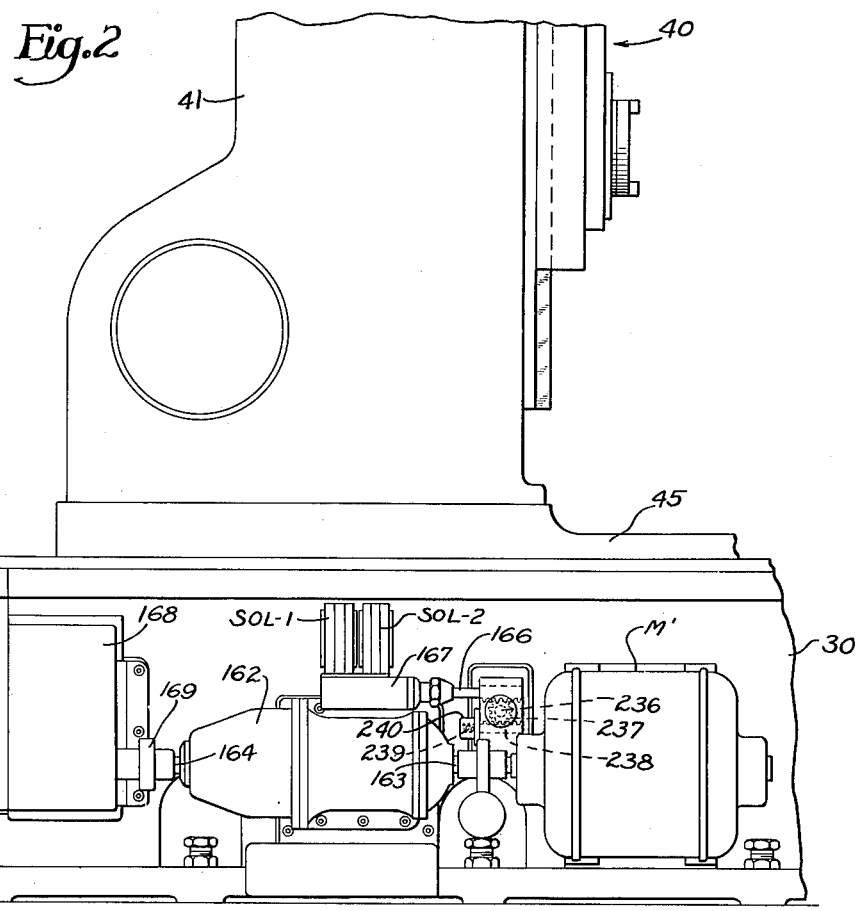
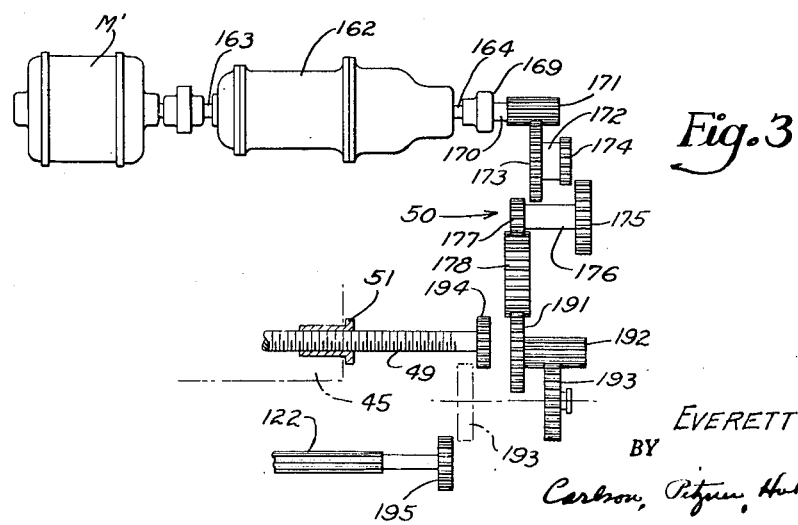
INVENTOR
EVERETT K. MORGAN
BY
Carlson, Pitzner, Hubbard & Wolfe
ATTORNEYS Patented Feb. 28, 1950

2,499,152

UNITED STATES PATENT OFFICE 2,499,152

CONTROL MECHANISM FOR MACHINE TOOLS

Everett K. Morgan, Fond du Lac, Wis., assignor to Giddings & Lewis Machine Tool Co., Fond du Lac, Wis., a corporation of Wisconsin Original application January 30, 1943, Serial No. 474,068. Divided and this application October 18, 1946, Serial No. 704,068

4 Claims. (Cl. 74—473)

The invention relates to control mechanism for machine tools, and more particularly to mechanism for manually controlling the operating functions of such machines.

This application is a division of my copending joint application with Hans B. Kraut and Keith F. Gallimore, Serial No. 474,068, filed January 30, 1943, now Patent No. 2,426,621, issued September 2, 1947.

One object of the invention is to provide improved mechanism by which a plurality of different operations of a machine tool may be accurately controlled through the medium of a single control element, thereby simplifying the work of the machine attendant and increasing the productive capacity of the machine.

Another object is to provide improved control mechanism by which both the direction of movement and the speed of a machine tool element may be accurately controlled by manipulation of a single hand lever.

A further object is to provide improved limit stop means for manual control mechanisms of the above general character.

Other objects and advantages of the invention will become apparent from the following detailed description of the preferred embodiment illustrated in the accompanying drawings, in which:

Figure 1 is a fragmentary front elevational view of the machine tool embodying the features of the invention.

Fig. 2 is a fragmentary rear elevational view of the machine.

Fig. 3 is a diagrammatic view of a part of the gearing of the machine shown in Figs. 1 and 2.

Fig. 4 is a sectional view of the control mechanism taken in a vertical plane substantially on the line 4—4 of Fig. 1.

Fig. 5 is a sectional view taken in a vertical plane substantially on the line 5—5 of Fig. 4.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

By way of illustration, the improved control mechanism has been shown in a machine tool of the type commonly known as a horizontal boring machine. The exemplary machine comprises an elongated bed 30 (Figs. 1 and 2) having horizontal ways on its upper face for supporting and guiding a reciprocable table or platen 45. An upright column 41 rising from one end of the platen 45 is formed with ways for supporting and guiding a vertically reciprocable spindle headstock 40, which may be of conventional construction.

Power driven means is provided for traversing the platen 45 along the ways in either direction and at selected feeding rates. Traversing of the platen is effected by means of a feed screw 49 (Fig. 3) adapted to be driven by a speed change mechanism 50. The feed screw is supported in the machine bed below the platen and cooperates with the nut 51 secured to the platen. Provision is also made for feeding the headstock 40 up and down at selected feeding rates through the medium of a vertically disposed feed screw 119 (Fig. 1) coacting with a feed nut 120 secured to the headstock. The feed screw 119 is, in this instance, driven by the speed change mechanism 50 through the medium of a splined driving shaft 122 extending longitudinally of the machine bed and having a conventional driving connection with the feed screw.

The speed change mechanism as herein shown comprises a variable speed reversible hydraulic transmission unit 162 of any suitable type. The transmission has a power inlet or driven shaft 163 and an outlet or driving shaft 164. The inlet shaft is directly coupled with the shaft of an electric motor M' and is driven continuously thereby at a uniform speed and in one direction when the machine is in use. The motor and the hydraulic unit may be conveniently mounted on the back wall of the machine bed, as shown in Fig. 2 of the drawings.

Hydraulic transmissions of the type herein shown are commonly equipped with means for controlling the direction of rotation and the speed of the outlet shaft. In the case of the transmission 162, the direction of rotation of the outlet shaft 164 is controlled by a pair of solenoids SOL—1 and SOL—2 (Fig. 2) acting through suitable valves or the like (not shown). The arrangement is such that the shaft is driven in one direction, for example clockwise, when the solenoid SOL—1 is energized, and in the reverse direction, or counterclockwise, when both solenoids SOL—1 and SOL—2 are energized. The speed of rotation of the outlet shaft is regulated by a shiftable plunger 166 operating through appropriate control mechanism enclosed in a casing 167 mounted on the top of the transmission unit.

Provision is made for connecting the outlet shaft 164 of the transmission unit with either the platen feed screw 49 or with the splined shaft 122 for either high speed or low speed operation. The means for effecting the speed range selection includes two-speed gearing and clutch means enclosed in a housing 168 set in a recess in the machine bed 30, as shown in Fig. 2. A coupler 169, of any suitable type, connects the outlet shaft 164 with a shaft 170 (Fig. 3) journaled in the housing 168 and having on its inner end an elongated pinion 171. A cluster gear 172 arranged to slide longitudinally of the pinion has a large gear element 173 in constant mesh with the pinion and a smaller gear element 174 adapted to mesh with a gear 175 fast on a shaft 176 upon movement of the cluster gear to the low speed position.

The shaft 176 has a small diameter pinion 177 in constant mesh with a large diameter idler gear 178 and is adapted to be drivingly engaged with the gear element 173 when the cluster gear is shifted to high speed position. Both gear elements of the cluster gear are disengaged and the drive is interrupted when the cluster gear is set in the central or neutral position in which it is shown in Fig. 3 of the drawings. In the exemplary machine the cluster gear is adapted to be shifted by the hand lever 187 (Fig. 1) through the medium of a suitable linkage (not shown).

The idler gear 178 is arranged to drive a gear 191 rigid with an elongated pinion 192. An axially slidable clutch gear 193 in constant mesh with the pinion is adapted to be shifted into meshing engagement selectively with a gear 194 keyed to the platen feed screw 49 or with a gear 195 fast on the splined shaft 122. For convenience of illustration, the actual position of the gear 193 relative to the gears 194 and 195 has been shown in broken lines in Fig. 3. A hand lever 199 (Fig. 1) is provided for shifting the clutch gear.

Through the medium of the gearing above described, the transmission 162 may be conditioned to drive either the platen feed screw 49 or the headstock feed shaft 122 through either of two selected speed ranges. The direction of movement of the machine elements and their rate of movement within either of the two-speed ranges is controlled by direct adjustment of the transmission unit 162. The invention provides control mechanism of a novel and advantageous character by which such adjustments may be effected by manipulation of a single conveniently accessible hand lever. The ease and accuracy of control thus provided materially simplifies the work of the machine attendant and substantially increases the productive capacity of the machine. In the case of large machines, such as the exemplary machine, duplicate control members may be provided at two or more stations so that the attendant can exercise full control over the machine while remaining at the most advantageous position for observing the operation being performed.

Referring now to Figs. 1 and 4 of the drawings, the speed and direction control mechanism in its preferred form comprises a control unit 210 mounted on the front wall of the machine bed 30 at a conveniently located point, as, for example, adjacent the head end of the bed. Additional units may be mounted at other locations according to the particular requirements of the machine involved. Such additional units are substantially identical in construction to the unit 210 and all are mechanically coupled, as will appear presently.

The control unit 210, as shown in Fig. 4, comprises a generally cylindrical housing 211 having an eccentrically located, rearwardly extending hub portion 212 rotatably supported in a panel 213 adapted to be bolted or otherwise removably secured over a flanged opening 214 in the front wall of the bed 30. The body of the housing 211 engages the front wall of the panel and a gear element 215 secured to the inner end of the hub 212 as by a set screw 216 engages the rear wall of the panel to hold the housing against axial movement while permitting it to rotate freely in the panel.

Extending through the housing 211 and the hub portion 212 is an axial bore 217 connecting with a traverse bore 218 in the body of the housing. A cylindrical plunger 219 is slidably supported in the first mentioned bore and is held against rotation therein by a key 220 engaging in a keyway 221 in the hub.

A single hand lever 222 is provided for reciprocating the plunger and for rocking the housing about the axis of the hub. As herein shown, the hand lever is formed with a rigid ball 223 intermediate its ends adapted to set in a suitable socket formed in the housing 211. The ball is retained in its socket by a retaining plate 224 fixed to the housing. The inner end of the hand lever extends into the bore 217 and is provided with an enlarged head 225 engaging in a slot 226 in the plunger 219. Preferably the slot 226 is dimensioned to receive the head 225 with a sliding fit so that the plunger may be shifted axially by rocking the hand lever toward or from the machine bed on the axis of the ball 223. This slot, however, prevents the rocking of the hand lever about the ball 226 in any other plane. Accordingly, the entire housing responds when the lever is rocked in a plane parallel to the longitudinal axis of the machine bed.

The rotative movements of the housing are utilized in this instance for controlling the direction of rotation of the outlet shaft of the transmission unit 162 and thereby control the direction of movement of the platen or the headstock and tailstock. As herein shown, the control is effected through the medium of electrical switches including a forward switch FS (Fig. 5) and a reverse switch RS connected in the circuit with the solenoids SOL—1 and SOL—2. These switches may be of any suitable and well-known construction and are mounted on a rearwardly projecting flange of the panel 213 on opposite sides of the housing 211. For actuating the switches there is provided a control member or cam bar 230 (Figs. 1, 4 and 5) slidably supported for axial or endwise movement in the panel flange below the switches RS and FS. Rack teeth 231 formed on one side of the bar engage with the teeth of the gear element 215 which, as previously stated, is fixed to the hub of the housing 211. Thus rocking of the housing is effective to shift the cam bar axially.

The cam bar 230 is formed with notches as shown in Fig. 5 to provide spaced cam surfaces positioned for coaction respectively with the forward and reverse switches. The arrangement of the cam surfaces is such that movement of the bar in one direction is effective to close the forward feed switch FS while movement of the bar in the opposite direction closes both switches. Closure of the switches in the above manner energizes the solenoid SOL—1 and SOL—2 selectively to set the transmission unit 162 for driving the machine elements in the desired direction.

Movements of the hand lever 222 toward and from the machine bed are utilized for adjusting the transmission unit to regulate the speed at which the machine elements are moved. To this end the plunger 219 associated with the transmission is formed on its inner end with rack teeth 231' engaging gear teeth 232 on a rotatable control member or shaft 233 extending longitudinally of the machine bed. This shaft is suitably journaled in bearings carried by the panel 213 and carries a bevel gear 234 (Fig. 1) meshing with a bevel gear 235 fast on the end of the horizontal shaft 236. The shaft 236 extends transversely of the machine bed to project at the rear thereof and is provided with a pinion 237 (Fig. 2) meshing with rack teeth formed on the speed adjusting plunger 166 of the transmission unit. Thus by rocking the shaft 236, the speed adjusting plunger may be shifted in either direction as required to increase or decrease the speed of the outlet shaft 164 of the unit.

Means is provided for yieldably urging the adjusting mechanism in a direction to decrease the feed rate so that the movable elements will be slowed down automatically when the speed control hand lever 222 is released. For this purpose a rack member 238 is supported for engagement with the pinion 237 in opposed relation to the plunger 166. A spring 239 enclosed in a housing 240 urges the rack member to the right (as viewed in Fig. 2), thus yieldably biasing the speed control plunger 166 and the associated control mechanism toward a stop position.

In order to prevent the drive from being entirely stopped when the hand lever is released, means is provided for limiting the extent to which the control member can be returned by the action of the spring 239. As herein shown, the means provided for this purpose comprises a movable abutment in the form of a stop screw 241 (Fig. 4) positioned for coaction with the plunger 219. The stop screw is threaded into a nut 242 rotatably supported in antifriction bearings at the outer end of the bore 217 in the housing 211 and is held against rotation by having its inner end 243 squared and slidably entered in a complementary socket in the adjacent end of the plunger 219. The squared end portion of the screw is of sufficient length to maintain engagement in the socket in all positions of the plunger and screw and the head 225 has an opening 244 to receive the extended end 243 when the parts are brought together, as shown in the drawing. Since the screw is non-rotatable it is apparent that rotation of the nut 242 will be effective to shift it axially and thus determine the limit position of the plunger 219.

Suitable means is provided for rotating the nut 242 to set the stop screw in position to establish a desired feed rate. In the preferred form shown, this means comprises a knob 245 rotatably supported on the front end of the housing 211. The knob is formed with a flange or skirt portion 246 adapted to extend over the outer end of the nut, the skirt having internal gear teeth 247 meshing with external gear teeth 248 formed on the nut. Thus, by rotating the knob 245, the stop screw 241 may be shifted in or out as required for any operation. The knob may be suitably calibrated, of course, to indicate the setting of the stop screw.

In order to render a plurality of control units effective for control purposes, the cam bar 230 and shaft 233 are extended longitudinally of the machine bed and are operatively connected with the additional units in the same manner as above described for the unit 210. Thus, the direction control switches FS and RS and the speed control plunger 166 may be actuated by the hand levers of the other units in precisely the same manner as by the hand lever 222.

It will be apparent from the foregoing that the invention provides novel control mechanism by which both the direction and the speed of movement of a machine part may be conveniently controlled by manipulation of a single hand lever. The movements of the lever are distinctive for each type of control, being in two different angularly related planes, thus making it easy for the attendant to effect the desired control without chance of confustion. The ease and accuracy of control thus afforded greatly facilities the operation of the machine and materially increases its productive capacity.

I claim as my invention:

1. Control mechanism comprising, in combination, an axially shiftable control member, a rotatable control member, a common actuator for said members including a rotatably supported housing, a gear fast on said housing engaging rack teeth formed on said axially shiftable control member, a plunger slidable in an axial bore in said housing, rack teeth formed on said plunger engaging gear teeth formed in said rotatable control member, a hand lever operable to rotate said housing and to reciprocate said plunger selectively, an adjustable stop means carried by said housing and positioned to limit the range of movement of said plunger in one direction, and a member rotatably supported on said housing operable manually to adjust the position of said stop.

2. Control mechanism comprising, in combination, an axially shiftable control member, a rotatable control member, a common actuator for said members including a rotatably supported housing, a gear fast on said housing engaging rack teeth formed on said axially shiftable control member, a plunger slidable in an axial bore in said housing, rack teeth formed on said plunger engaging gear teeth formed in said rotatable control member, a hand lever carried by said housing for rotating the same, said hand lever being supported for pivotal movement relative to the housing and operative in such movement to reciprocate said plunger, a nut member rotatably supported on said housing in axial alinement with said plunger, a stop screw threaded in said nut member and having a non-rotatable connection with the plunger, and means carried by said housing for rotating said nut member to adjust the position of said stop screw.

3. Control mechanism comprising, in combination, an axially shiftable control member, a rotatable control member, a common actuator for said members including a rotatably supported housing, a gear fast on said housing engaging rack teeth formed on said axially shiftable control member, a plunger slidable in an axial bore in said housing, rack teeth formed on said plunger engaging gear teeth formed in said rotatable control member, a hand lever carried by said housing for rotating the same, said hand lever being supported for pivotal movement relative to the housing and operative in such movement to reciprocate said plunger, a nut member rotatably supported on said housing in axial alinement with said plunger, a stop screw threaded in said nut member and having a non-rotatable connection with the plunger, a knob rotatably supported on said housing, and cooperating gear teeth on said nut member and said knob for transmitting the rotational movements of the knob to the nut member to adjust the position of said stop screw.

4. Control mechanism comprising, in combination, an axially shiftable control member, a rotatable control member, common actuating means for said members including a rotatably supported housing, cooperating means on said axially shiftable member and said housing for imparting axial movement to the member in response to the rotation of said housing, a plunger slidable in an axial bore in said housing, coacting means on said plunger and said rotatable control member for rotating the latter in response to axial movements of the plunger, a hand lever operable to rotate said housing and to reciprocate said plunger selectively, adjustable stop means for said plunger including a nut rotatably supported on said housing, a screw threaded into said nut and presenting an abutment in the path of said plunger, cooperating means on the plunger and said screw for restraining the latter against rotation with said nut, and means for rotating said nut.

EVERETT K. MORGAN.

REFERENCES CITED

The following references are of record in the file of this patent:

UNITED STATES PATENTS

| Number | Name | Date |
| --- | --- | --- |
| 1,826,906 | Townsend | Oct. 13, 1931 |
| 2,001,987 | Sykes | May 21, 1935 |
| 2,011,068 | Miner | Aug. 13, 1935 |
| 2,297,422 | Mobins | Sept. 29, 1942 |
| 2,348,265 | Rippingille | May 9, 1944 |